No. 810,240. PATENTED JAN. 16, 1906.
P. A. WEYAND.
ELECTRIC MOTOR CONTROLLER REGULATOR.
APPLICATION FILED JUNE 14, 1905.
3 SHEETS—SHEET 1.
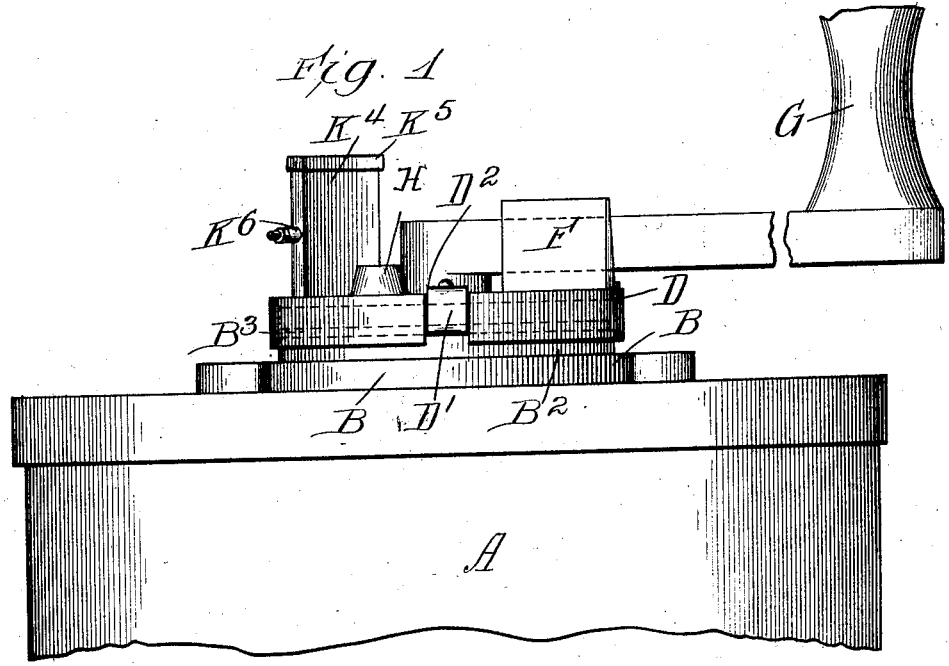
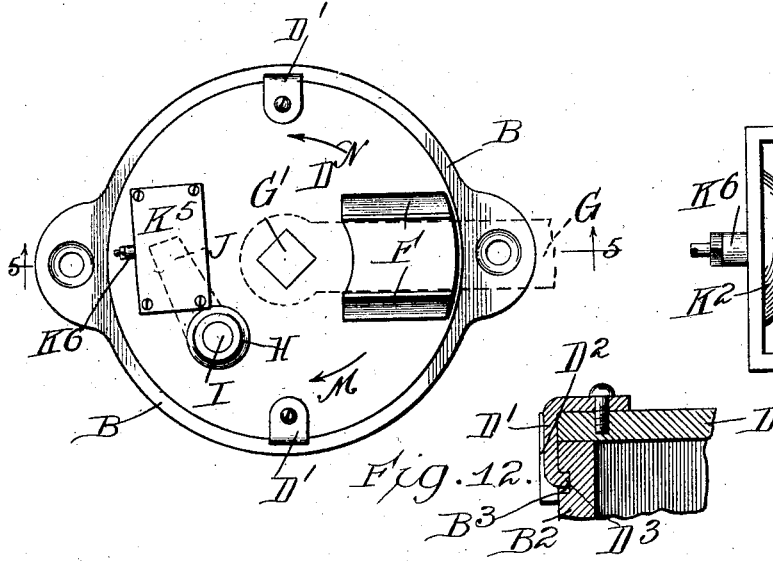
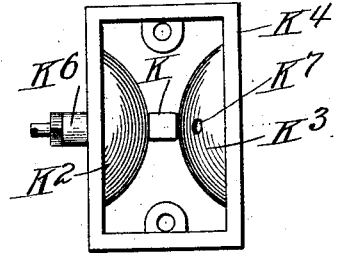
Witnesses:
Harry R. L. White.
Joseph Staab
Inventor
Paul A. Weyand
By Morgan & Rubinstein Attys No. 810,240.　　　　　　　　　　　　　　　　　　PATENTED JAN. 16, 1906.
P. A. WEYAND.
ELECTRIC MOTOR CONTROLLER REGULATOR.
APPLICATION FILED JUNE 14, 1905.
3 SHEETS—SHEET 2.
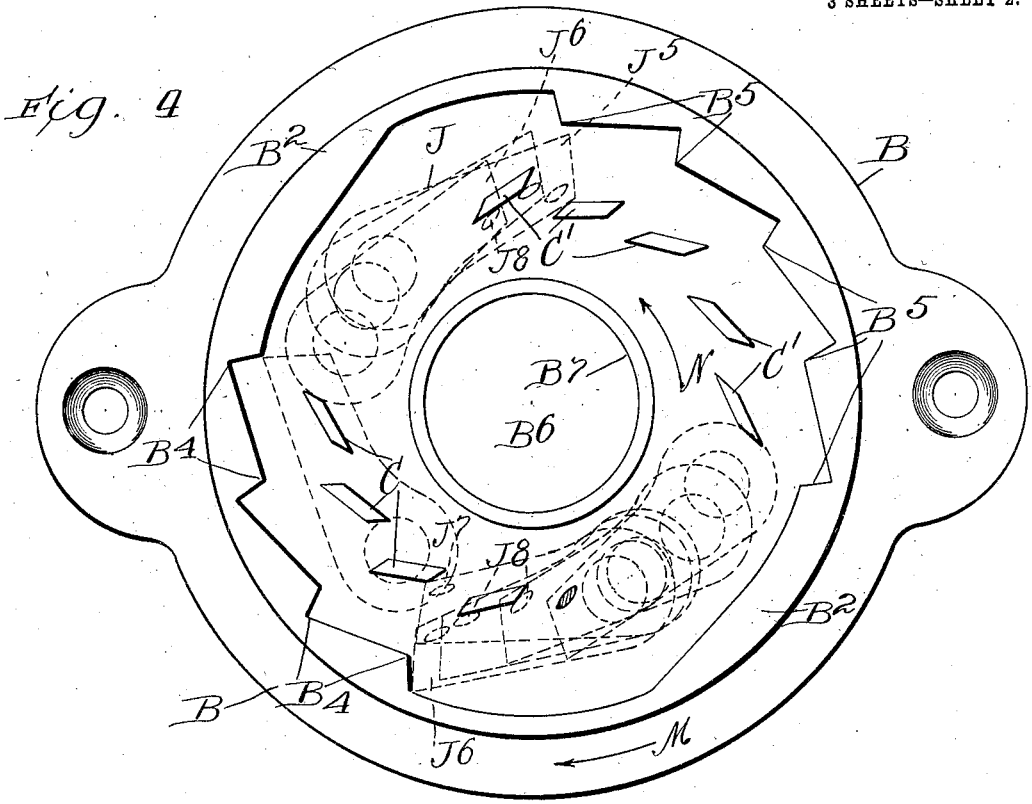
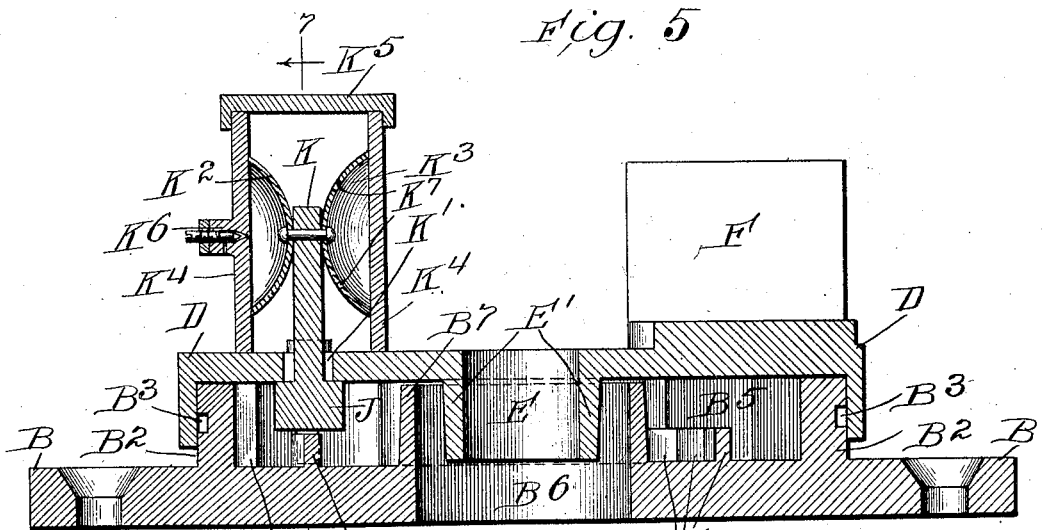
Witnesses:
Harry R. L. White.
Joseph Staab
Inventor:
Paul A. Weyand,
By Morgan & Robinson, Attys No. 810,240. PATENTED JAN. 16, 1906.
P. A. WEYAND.
ELECTRIC MOTOR CONTROLLER REGULATOR.
APPLICATION FILED JUNE 14, 1905.
3 SHEETS—SHEET 3.
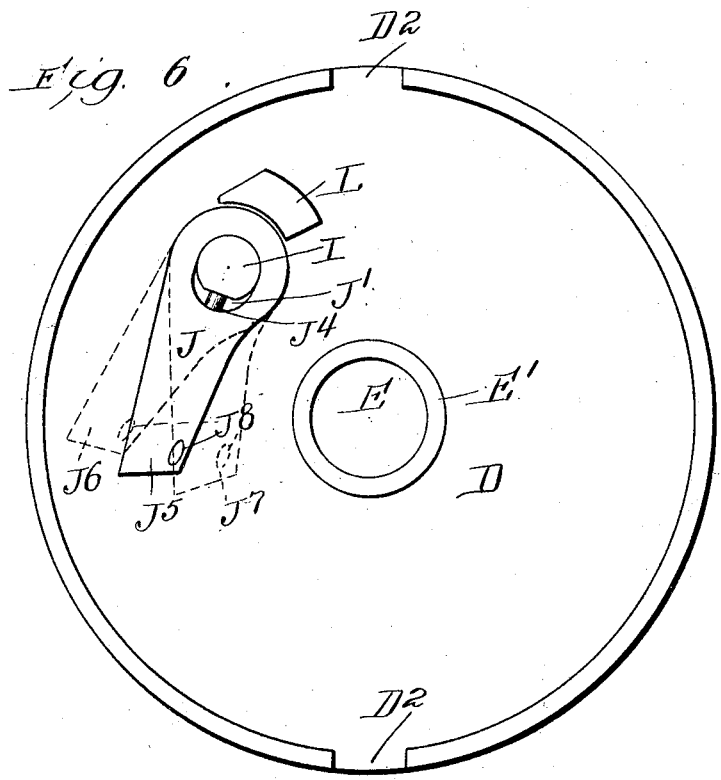
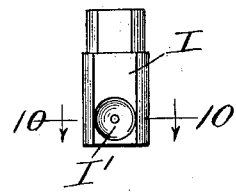
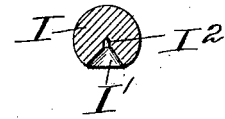
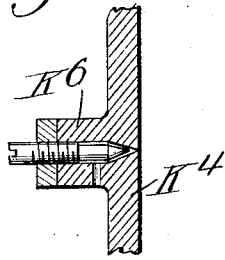
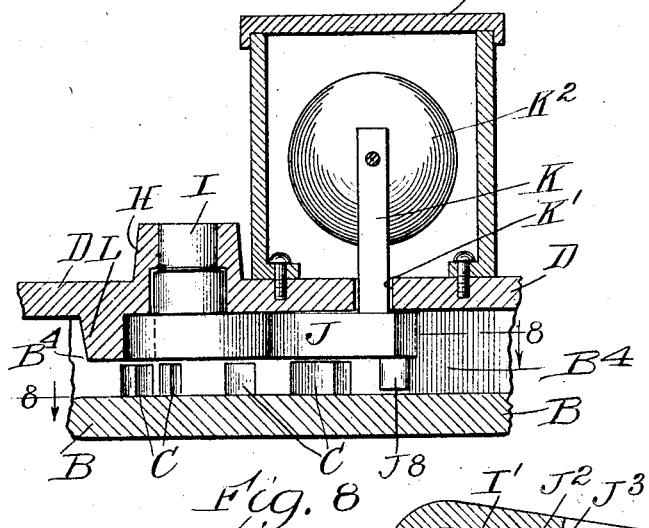
Witnesses:
Harry R. L. White
Joseph Staab
Inventor
Paul A. Weyand
By Morgan & Finkelstein Attys

UNITED STATES PATENT OFFICE.

PAUL A. WEYAND, OF MAYWOOD, ILLINOIS.

ELECTRIC-MOTOR-CONTROLLER REGULATOR.

No. 810,240.

Specification of Letters Patent.

Patented Jan. 16, 1906.

Application filed June 14, 1905. Serial No. 265,215.

*To all whom it may concern:*

Be it known that I, PAUL A. WEYAND, a citizen of the United States, residing at 626 South Fourteenth avenue, in the village of Maywood, county of Cook, and State of Illinois, have invented a new and useful Improvement in Electric-Motor-Controller Regulators, of which the following is a specification.

My invention relates to that class of devices designed to automatically regulate the movement of the controller of electric motors.

The object of my invention is to provide an automatic regulator of cheap and simple construction that by direct and positive action retards the movement of the controller while the current is being turned on, that can be easily attached to the controller in common use, that can be timed in its movements automatically and its operative parts be perfectly lubricated.

The manner in which I accomplish my objects is described in the following specification, and illustrated in the accompanying drawings, in which—

Figure 1 is a side elevation showing the regulator in position on the controller-casing. Fig. 2 is a top plan view of the regulator, the controller-casing not being shown. Fig. 3 is an enlarged top view of the timing device looking into the box. Fig. 4 is a diagrammatic view of the interior of the base of the regulator, showing the construction and movements of the mechanism. Fig. 5 is a vertical sectional view on the line 5 5, Fig. 2, looking in the direction of the arrows. Fig. 6 is an interior plan view of the cover or top part of the regulator, showing the position, mode of attachment of the pawl to the cover, and limit of its movement. Fig. 7 is a vertical sectional view on the line 7 7, Fig. 5, looking in the direction of the arrows, showing the attachment and position of the pawl and its connection with the timing mechanism. Fig. 8 is a sectional view of the pawl on the line 8 8, Fig. 7, looking in the direction of the arrows, showing the spring mechanism by which it is held in position on the pivot affixed in the cover. Fig. 9 is a detailed view of the pivot-stud on which the pawl is secured. Fig. 10 is a cross-section of the same parts on the line 10 10, showing the recess therein. Fig. 11 is an enlarged sectional view of the air-valve forming part of the time mechanism. Fig. 12 is a sectional detailed view showing the manner in which the cover is attached to the base of the regulator.

In the drawings, A represents the controller-casing in use on trolley-cars. On this casing the base B of the regulator is secured by the screws B' or by other suitable means. On this base and forming a part thereof is a vertical cylindrical part $B^2$, in which there is an external channel $B^3$. In the inside of the part $B^2$ and forming part thereof are two series of ratchet-teeth $B^4$ and $B^5$, the number and relative position of these teeth corresponding with the number and position of "points" in the controller. In the center of the base is a cylindrical aperture $B^6$, its wall $B^7$ extending the same height as the part $B^2$. Midway between the series of the ratchet-teeth and wall $B^7$ are two series of tetragonal studs C and C'. These studs correspond in number and relative position with the ratchet-teeth and form an integral part of the base.

Over the cylindrical part $B^2$ and the interior of the base a cover D is fitted, the outside vertical part covering the channel $B^3$ in the cylindrical part $B^2$. This cover is secured on the base by two dogs D', which are secured in the recesses $D^2$ in the cover D. The lip $D^3$ of each of these dogs fit into the channel $B^3$. Thus attached the cover is free to be revolved on the base. In the center of the cover is a cylindrical aperture E. The wall E' of this aperture extends into the aperture $B^6$ in the base. On the top of the cover and forming part thereof is a radial jaw F, adapted to receive the shank of the controller-handle G, which is thereby connected with the cover and by said connection the cover is revolved. Through the aperture E the controller-rod G' extends. On this rod the handle G is placed.

Affixed in the boss H, forming part of the cover, is a pivot-stud I, which projects on the inside of the cover into the interior of the base B. In this stud is a countersunk recess I' and center hole $I^2$. The vertical center of this recess corresponds with the line of an imaginary circle having its center in the center of the cover and passing through the studs C and C'. On this pivot is a pawl J. The pivot-hole J' of the pawl is slightly oblong, its greatest diameter being in the direction of the length of the pawl. From this pivot-hole J' a pin-hole $J^2$ extends horizontally into the length of the pawl. In this hole a spring $J^3$ is placed and against the spring a pin $J^4$. The pointed end of this pin is forced by the spring into the center of the recess $I'$, and thereby holds the pawl on the stud and forces the pawl back to its normal position $J^5$ from the positions $J^6$ and $J^7$, as shown in Fig. 6, and holds it there at all times when the pawl is free from engagement with the ratchet-teeth and studs $C$ and $C'$. The pressure of this spring and pin on the pawl and pivot-stud holds the pivot end of the pawl close to the pivot-stud, as shown in Figs. 6 and 8. On the under side near the free end of the pawl is an oval post $J^8$, as shown in Figs. 4, 6, and 7. On the top of the pawl is an arm $K$, which extends through a slot $K'$ in the cover, in which it is free to move. To the upper part of this arm two cups $K^2$ and $K^3$ are attached, the cup $K^3$ being perforated, as shown at $K^7$, Fig. 5. These cups and arm are covered by a box $K^4$, which is affixed on the cover $D$. This box is provided with a lid $K^5$ and an air-valve $K^6$, as shown in detail in Fig. 11.

When the regulator is constructed as described and illustrated in the drawings and attached to the controller, its operation and the movement of its several parts are as follows: The handle $G$ is placed on the controller-rod $G'$, which projects through the aperture $E$ in the cover $D$, the shank of the handle resting in the jaw $F$, as shown in Figs. 1 and 2, and in position ready to be moved to turn on the electric current. In this position the pawl is free from contact with the ratchet-teeth and studs in the base and is held at rest in the normal position $J^5$. (See Figs. 4 and 6.) The movement of the handle to turn on the current revolves the cover and pawl in the direction of the arrow M, (see Figs. 2 and 4,) and as this movement continues the post $J^8$ on the pawl strikes the end of the first stud in the series C and slides along its outer face. This contact of the post and stud forces the free end of the pawl outward from its normal position $J^5$ to the position $J^6$ and into engagement with the first of the ratchet-teeth in the series $B^4$ and stops the movement of the controller at the first point. The force of the contact of the pawl and tooth is transferred through the pivot end of the pawl to the stop-block L. The oblong pivot-hole in the pawl prevents this force acting on the pivot-stud and allows it to force the pin $J^4$ back on the spring $J^3$, which is thereby compressed. Before the controller can be moved to the next point the handle must be slightly reversed, so as to release the nose of the pawl from contact with the ratchet-tooth. When this is done, the pressure of the spring $J^3$ forces the pin $J^4$ into the center of the recess $I'$ in the pivot I. This force moves the pawl back to the normal position $J^5$, and places the post $J^8$ between the ends of the first and second studs in series C. The controller can then be moved forward again, the post $J^8$ striking the end and sliding along the outer face of the second stud, the pawl being thereby forced outward into the position $J^6$ and into contact with the second ratchet-tooth in the series $B^4$, the controller being thereby stopped at the second point. The handle is again slightly reversed, the pawl resumes its normal position again, and the controller can be then moved to the third point. These movements can be repeated till each of the ratchet-teeth in both series have been engaged by the pawl and all the points have been made by the controller and the full current thereby turned on. The reverse movement of the controller in the direction of the arrow N, whereby the current is cut off, can be made at any point in the revolution of the handle, rod, and regulator-cover. When the reverse movement begins after the pawl-post $J^8$ has passed one or more of the studs in the series C or $C'$, the post strikes the reverse end of the nearest stud and slides along the inside face of the stud, thereby forcing the pawl to the inside position $J^7$, as shown in Fig. 4, and out of all possible contact with the ratchet-teeth or other part of the interior of the base. If it is desirable to retard the movement of the pawl from the outer position $J^6$ back to the normal position $J^5$, and thereby time the movement of the controller from point to point, it can be accomplished by providing the pawl with the arm K, cups $K^2$ and $K^3$, slot $K'$ in the cover, and a box $K^4$. With the regulator so constructed each forward movement of the controller-rod, handle, cover, and pawl compresses the cup $k^2$ and expels the air from within the cup through the air-valve $K^6$, creates a vacuum in the cup, and retards the movement of the pawl till that vacuum is destroyed by the flow of air through the air-valve. This flow of air can be regulated by the adjustment of the air-valve. The cup $K^3$ when compressed by the reverse movement simply assists the action of the spring $J^3$ and pin $J^4$ in forcing the pawl from the position $J^7$ back to the position $J^5$.

The interior of the base may be filled with a suitable lubricant to reduce the friction of the moving parts, the cylindrical part $B^2$ and wall $B^7$ of the base and the cover D and the wall $E'$ being sufficient to retain the lubricant within the base.

It is obvious that the arm K, cups $K^2$ $K^3$, box $K^4$, and air-valve $K^6$ may be dispensed with without materially affecting the efficiency of my regulator, and I therefore do not limit myself to its use on my improvement.

What I claim as new, and desire to secure by Letters Patent, is—

1. In an electric controller-regulator of the kind described, the combination of a main body having a base, B, a cylindrical part B², a series of interior ratchet-teeth, B⁴, and B⁵, a series of studs, C and C', and a central aperture, B⁶, said body being adapted to fit over an electric controller-rod and to be affixed to a controller, with a revoluble cover, D, having a central aperture, E, a jaw, F, adapted to receive the shank of a handle of an electric controller; and a pawl, J, pivotally attached to the inside of said cover, said pawl being adapted to be engaged by the studs, C and C', and to be deflected thereby into engagement with said ratchet-teeth; and means for returning said pawl from its deflected position to a normal position, J⁶, substantially as described and for the purposes specified.

2. In an electric controller-regulator of the kind described a main body having a base, B, a cylindrical projection, B², a series of interior ratchet-teeth, B⁴ and B⁵, a series of studs, C and C', and an aperture, B⁶; with a cover, D, having a central aperture, E, and a jaw, F; means for securing said cover on the base part, B², and of permitting the cover to be revolved thereon; and a pawl, J, pivotally supported in said cover, said pawl having a post, J⁸, adapted to be engaged by the studs, C and C', and the pawl be thereby deflected when the cover is revolved, and means for returning said pawl from the deflected position to the normal position of rest, J⁶, substantially as described and for the purposes specified.

3. In an electric controller-regulator of the kind described the combination of a main cylindrical body, having interior ratchet-teeth, studs and a central aperture, with a revoluble cover, having a central aperture, E, a jaw, F, and a stop-block, L, and a pawl, J, pivotally supported in said cover, said pawl being adapted to be engaged by the studs, C and C', in the said main body, and to be deflected thereby into engagement with the said ratchet-teeth when said cover is revolved; and means for returning said pawl from its deflected positions to a normal position, J⁶; substantially as described and for the purposes specified.

4. In an electrical controller-regulator of the kind described, the combination of a main cylindrical body having a series of interior ratchet-teeth, and a series of studs, C and C', and a central aperture, B⁶, and a cover, D, adapted to fit and to be revolved on said main body, said cover having a central aperture, E, a jaw, F, and stop-block, L; with a pawl, J, pivotally supported in said cover, said pawl being adapted to be engaged by the said studs and to be deflected thereby into engagement with the said ratchet-teeth when said cover is revolved on said main body; and means for returning said pawl when so deflected to a normal position of rest, J⁶; substantially as described and for the purposes specified.

5. In an electric controller of the kind described the combination of a main cylindrical body having a series of interior ratchet-teeth, a series of studs and a central aperture, B⁶, and a cover, D, adapted to fit and be revolved on said main body, said cover having a central aperture, E, a jaw, F, and a stop-block, L; with a pawl, J, pivotally supported in said cover, said pawl having a post, J⁸, adapted to be engaged by the said studs, and to thereby deflect said pawl into engagement with the said ratchet-teeth when said cover is revolved on said main body; and means for returning said pawl when so deflected, to a normal position of rest; substantially as described and for the purposes specified.

6. In an electric controller-regulator of the kind described, the combination of a main cylindrical body having a series of interior ratchet-teeth, a series of studs and a central aperture, and a cover, D, revolubly attached to said main body, said cover having a central aperture, E, a jaw, F, a stop-block, L, and a pivot-stud, I, said stud having a countersunk recess, I', with a pawl, J, adapted to be supported on said pivot-stud, said pawl being provided with a spring, J³, and a pin, J⁴, actuated by said spring, and being thereby forced into the recess, I', in the pivot-stud, I, said spring and pin being adapted to hold said pawl in a position of rest on said pivot-stud, and to return it to said position when deflected therefrom; substantially as described and for the purposes specified.

7. In an electric controller-regulator of the kind described the combination of a main cylindrical body having a series of interior ratchet-teeth, a series of studs, C and C', a central aperture, B⁶; and a cover, D, revolubly attached to said main body, said cover having a central aperture, E, a jaw, F, a stop-block, L, and a pivot-stud, I, with a pawl, J, supported on the said pivot-stud, said pawl having an arm, K, extending through a suitable slot, K', in the cover, D, and a pair of cups, K² and K³, attached to said arm, and a box, K⁴, covering said cups and arm; said box being provided with an air-valve, K⁶, and being attached to said cover; substantially as described and for the purposes specified.

8. The combination with an electric controller of a controller-regulator herein described, comprising a main body having a series of ratchet-teeth, a series of studs, and a central aperture, said body being provided with a cover revolubly secured thereon, said cover having a central aperture, a jaw, a pivot-stud, and stop-block, and a pawl supported on said pivot-stud, said pawl being adapted to be engaged by said studs and to be thereby deflected into engagement with said ratchet-teeth; and means for returning said pawl from the deflected positions to a position of rest; and means for regulating the time of the movement of said pawl from engagement with said teeth to a position of rest; substantially as described and for the purposes specified.

9. The combination with an electric controller of a controller-regulator, herein described, comprising a main body having a series of ratchet-teeth, a series of studs, and a central aperture, and a cover revolubly secured on said main body, said cover having a central aperture, a jaw, a pivot-stud, and a stop-block, and a pawl supported on said pivot-stud, said pawl being adapted to be engaged by said series of studs, and to be thereby deflected when said cover is revolved and means for returning said pawl from the deflected positions to a position of rest; substantially as described and for the purposes specified.

PAUL A. WEYAND.

Witnesses:
JOSEPH STAAB,
THOMAS J. MORGAN.